(12) United States Patent
Fu

(10) Patent No.: US 9,619,075 B2
(45) Date of Patent: Apr. 11, 2017

(54) EMBEDDED DISPLAY PANELS AND TERMINALS WITH TOUCH FUNCTION, AND TOUCH DETECTING METHOD

(71) Applicant: Shenzhen China Star Optoelectronics Technology Co., Ltd., Shenzhen, Guangdong (CN)

(72) Inventor: Ruhai Fu, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 96 days.

(21) Appl. No.: 14/433,615

(22) PCT Filed: Dec. 17, 2014

(86) PCT No.: PCT/CN2014/094059
§ 371 (c)(1),
(2) Date: Apr. 3, 2015

(87) PCT Pub. No.: WO2016/090654
PCT Pub. Date: Jun. 16, 2016

(65) Prior Publication Data
US 2016/0162097 A1    Jun. 9, 2016

(30) Foreign Application Priority Data
Dec. 9, 2014 (CN) .......................... 2014 1 0749399

(51) Int. Cl.
*G06F 3/045*    (2006.01)
*G06F 3/041*    (2006.01)
*G02F 1/1333*   (2006.01)

(52) U.S. Cl.
CPC ........ *G06F 3/0416* (2013.01); *G02F 1/13338* (2013.01); *G06F 3/0412* (2013.01)

(58) Field of Classification Search
CPC ........ G06F 3/0416; G06F 3/041; G06F 3/044; G06F 3/0488
(Continued)

(56) References Cited

U.S. PATENT DOCUMENTS 7,982,694 B2 * 7/2011 Ogura .................. G09G 3/3233
                                                       345/76
9,046,944 B2 * 6/2015 Ahn ...................... G06F 3/0416
(Continued)

*Primary Examiner* — Vijay Shankar
(74) *Attorney, Agent, or Firm* — Andrew C. Cheng

(57) ABSTRACT

An embedded display panel and a terminal with touch function and a touch detection method are disclosed. The display panel includes an up substrate, a down substrate, and a liquid crystal layer between the up substrate and the down substrate. In addition, a touch electrode layer is formed between the liquid crystal layer and the up substrate, and the touch electrode layer includes a plurality of electrodes arranged in a matrix. A driving selector is arranged between the up substrate and the down substrate, and each of the electrodes is connected to the corresponding driving selector via lead wires. A touch controller is arranged outside a space defined by the up substrate and the down substrate. The touch controller is connected to the driving selector via a signals selection line and a scanning signal line, and a number of the signal selection line and the scanning signal line is less than the number of the lead wires. The touch controller is configured for transmitting selection signals to the driving selector via the signal selection line, and driving selector is configured for selecting at least one of the lead wires to be connected with the scanning signal line in response to the selection signals. In this way, the number of the lead wires needed to connect with the touch controller may be greatly reduced.

10 Claims, 4 Drawing Sheets

(58) Field of Classification Search
USPC .................................................. 345/173–178
See application file for complete search history.

(56) References Cited

U.S. PATENT DOCUMENTS

| 9,323,403 | B2* | 4/2016 | Ma | ........................... G06F 3/044 |
| 2007/0216613 | A1* | 9/2007 | Ogura | .................. G09G 3/3233 345/76 |

* cited by examiner

EMBEDDED DISPLAY PANELS AND TERMINALS WITH TOUCH FUNCTION, AND TOUCH DETECTING METHOD

BACKGROUND OF THE INVENTION

1. Field of the Invention

The present disclosure relates to embedded display panel, and more particularly to an embedded display panel and a terminal with touch function, and touch detection method.

2. Discussion of the Related Art

Currently, the touch panel includes discrete touch panels and embedded touch panels. The embedded touch panels have embedded touch sensors within the liquid crystal panel so as to realize thin panel design.

Generally, electrodes are arranged between the up and down substrates of the self-capacitance touch panels, and the electrode array are arranged on the whole substrates. The electrodes may be conductive layers or any kind of conductive materials. Only one electrode is needed for the self-capacitance touch panels. The touch event can be determined by detecting the capacitance formed between the electrode and a touching object. In addition, The touch point may be calculated by the amount of the capacitance of the adjacent electrodes. Specifically, all of the electrodes of the touch panel is pulled out and are formed to be a plurality of bonding pins via bonding packing. Each of the electrodes corresponds to one pin so as to connect to an external driving chip. The external driving chip is configured for respectively scanning the internal electrode to determine the touch event.

However, it can be understood that more electrodes are needed when the demand for the detection precision of the touch panel is high. As each of the electrode corresponds to one pin, the conventional structure of the touch panel may include a large number of bonding pins, which requires a higher precision of manufacturing process and thus may affect the manufacturing efficiency to some extent.

SUMMARY

According to the present disclosure, the driving selector is configured for selecting the electrode connecting to the touch controller one by one so as to scan the touch, which greatly reduces the number of lead wires connected to the touch controller.

In one aspect, an embedded display panel with touch function includes: an up substrate, a down substrate, and a liquid crystal layer between the up substrate and the down substrate; a touch electrode layer formed between the liquid crystal layer and the up substrate, and the touch electrode layer comprising a plurality of electrodes arranged in a matrix; a driving selector being arranged between the up substrate and the down substrate, each of the electrodes being connected to the corresponding driving selector via lead wires; and a touch controller being arranged outside a space defined by the up substrate and the down substrate, the touch controller being connected to the driving selector via a signals selection line and a scanning signal line, and a number of the signal selection line and the scanning signal line is less than the number of the lead wires; and the touch controller is configured for transmitting selection signals to the driving selector via the signal selection line, and driving selector is configured for selecting at least one of the lead wires to be connected with the scanning signal line in response to the selection signals.

Wherein the driving selector includes a plurality of switching modules, each of the switching modules includes a first end, a second end, and a control end, the first ends of each of the switching modules are connected with each other, and are connected with the touch controller via the scanning signal line; each of the second ends of the switching modules connects with the electrode via one lead wire; and each of the control ends of the switching modules connects with the touch controller via the signal selection line.

Wherein the display panel includes a plurality of signal selection lines, each of the signal selection lines connects with the control ends of a number of switching modules, and the number of the switching modules connecting with the signal selection line are the same or different.

Wherein the display panel includes a plurality of scanning signals line, each of the scanning signals lines connects with the first end of a number of switching modules, and the number of the switching modules connecting with the signal selection line are the same or different.

Wherein the display panel further includes at least two pins for binding bonding packages, and the signal selection line and the scanning signal line being connected to the corresponding pins of the at least two bonding packages so as to connect the driving selector and the touch controller.

Wherein the display panel is a self-capacitance touch panel.

In another aspect, a terminal includes: an embedded display panel with touch function, the display panel includes: an up substrate, a down substrate, and a liquid crystal layer between the up substrate and the down substrate; a touch electrode layer formed between the liquid crystal layer and the up substrate, and the touch electrode layer comprising a plurality of electrodes arranged in a matrix; a driving selector being arranged between the up substrate and the down substrate, each of the electrodes being connected to the corresponding driving selector via lead wires; and a touch controller being arranged outside a space defined by the up substrate and the down substrate, the touch controller being connected to the driving selector via a signals selection line and a scanning signal line, and a number of the signal selection line and the scanning signal line is less than the number of the lead wires; and the touch controller is configured for transmitting selection signals to the driving selector via the signal selection line, and driving selector is configured for selecting at least one of the lead wires to be connected with the scanning signal line in response to the selection signals.

Wherein the driving selector includes a plurality of switching modules, each of the switching modules includes a first end, a second end, and a control end, the first ends of each of the switching modules are connected with each other, and are connected with the touch controller via the scanning signal line; each of the second ends of the switching modules connects with the electrode via one lead wire; and each of the control ends of the switching modules connects with the touch controller via the signal selection line.

Wherein the display panel includes a plurality of signal selection lines, each of the signal selection lines connects with the control ends of a number of switching modules, and the number of the switching modules connecting with the signal selection line are the same or different.

Wherein the display panel includes a plurality of scanning signals line, each of the scanning signals lines connects with the first end of a number of switching modules, and the number of the switching modules connecting with the signal selection line are the same or different.

Wherein the display panel further includes at least two pins for binding bonding packages, and the signal selection line and the scanning signal line being connected to the corresponding pins of the at least two bonding packages so as to connect the driving selector and the touch controller.

Wherein the display panel is a self-capacitance touch panel.

In another aspect, a touch detection method includes: receiving selection signals; selecting at least one touch electrode within a display panel to be connected with the touch controller outside the display panel in response to the selection signals so as to realize a touch function.

Wherein the selecting step further includes: receiving scanning signals transmitted from the touch controller and then transmitting the scanning signals to the selected touch electrode so as to scan electrodes, and transmitting the corresponding electrode signals to the touch controller; and determining a coordinate of touch points in accordance with the received electrode signals from the touch electrodes.

Wherein the display panel is a self-capacitance touch panel, and the receiving step further includes: receiving the scanning signal transmitted from the touch controller and then transmitting the scanning signals to the selected touch electrode to perform self-capacitance electrode scanning.

In view of the above, the touch electrode layer is arranged on the liquid crystal layer of the display panel. In addition, the driving selector is arranged within the display panel such that the leading wires are connected with the electrodes one by one. The touch controller outside the display panel is connected with the driving selector via the signal selection line and the scanning signal line. In addition, in response to the selection signals transmitted by the signal selection line, the driving selector is controlled to select at least one lead wire from a plurality of lead wires to be electrically connected with the scanning signals line. In addition, the number of the signal selection line and the scanning signal line is less than the number of the lead wires so as to greatly reduce the number of the leading wires needed to be connected to the touch controller.

DETAILED DESCRIPTION OF THE EMBODIMENTS

Embodiments of the invention will now be described more fully hereinafter with reference to the accompanying drawings, in which embodiments of the invention are shown.

Figure 1:
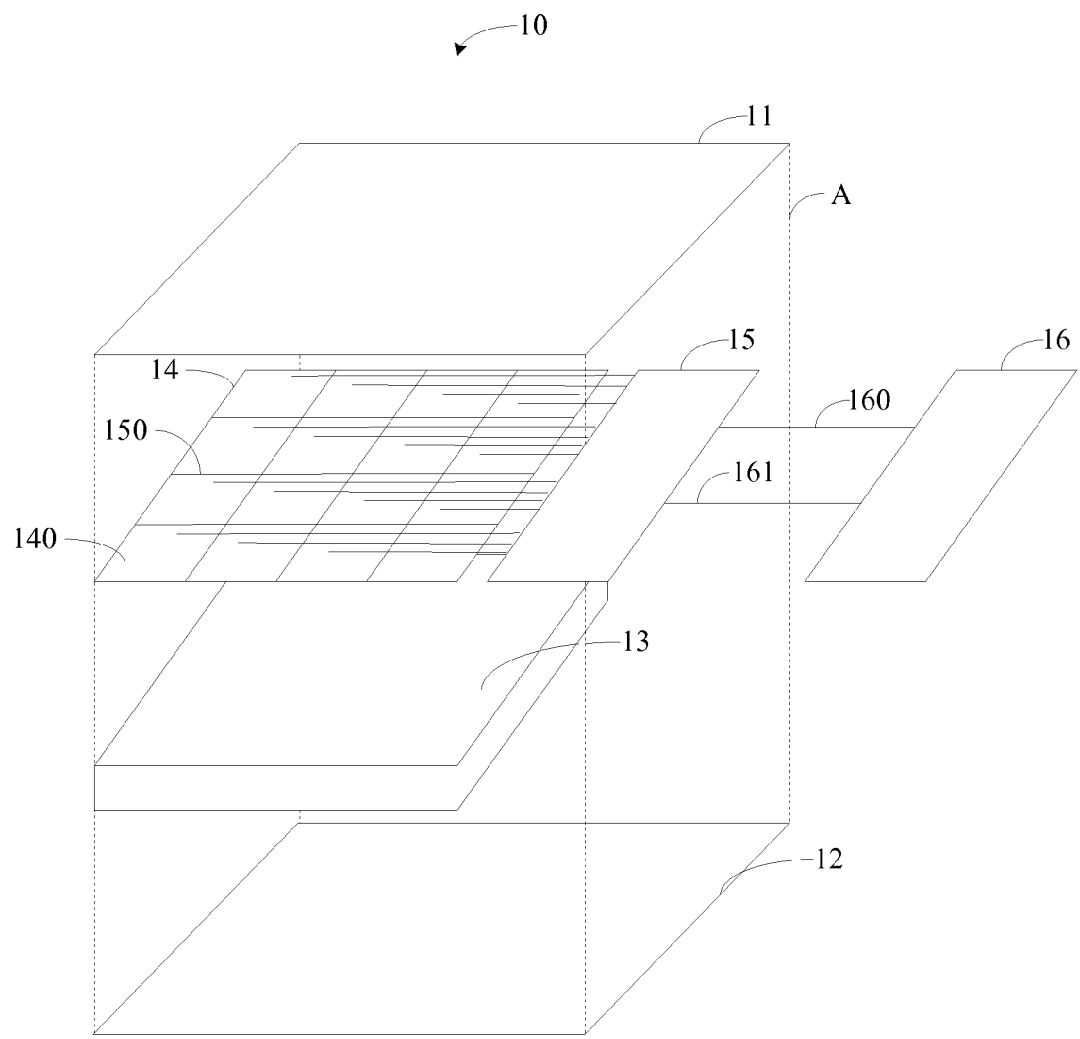
FIG. 1 is a schematic view of the embedded display panel with touch function in accordance with a first embodiment.

FIG. 1 is a schematic view of the embedded display panel with touch function in accordance with a first embodiment. The display panel 10 includes an up substrate 11, a down substrate 12, a liquid crystal layer 13, and a touch electrode layer 14. The liquid crystal layer 13 is arranged between the up substrate 11 and the down substrate 12. The touch electrode layer 14 is formed between the liquid crystal layer 13 and the up substrate 11. The touch electrode layer 14 includes a plurality of electrodes 140 arranged in a matrix.

The display panel 10 includes a driving selector 15 and a touch controller 16. The driving selector 15 is arranged between the up substrate 11 and the down substrate 12. In addition, each of the electrodes 140 connects to the corresponding driving selector 15 via lead wires 150. In the embodiment, the driving selector 15 has not been overlapped with the top substrate 11, the down substrate 12, the liquid crystal layer 13, and the touch electrode layer.

The touch controller 16 is arranged outside a space defined by the up substrate 11 and the down substrate 12, as indicated by "A." In addition, the touch controller 16 connects to the driving selector 15 via a signal selection line 160 and a scanning signal line 161. The number of the signal selection line 160 and the scanning signal line 161 is less than the number of the lead wires 150.

The touch controller 16 transmits selection signals to the driving selector 15 via the signal selection line 160. In response to the selection signals, the driving selector 15 select at least one of the lead wires 150 to be connected with the scanning signal line 161.

It can be understood that FIG. 1 only shows components relating to the claimed display panel while other conventional components are omitted. In the embodiment, the display panel may be an in-cell display panel.

In the embodiment, the display panel 10 may be a self-capacitance touch panel.

The liquid crystal layer 13 of the display panel 10 is configured for displaying images. The touch electrode layer 14 is for performing the touch functions in response to the detection of the touch controller 16. The liquid crystal layer 13 and the touch electrode layer 14 may operate independently. The operation principle of the display panel 10 is described hereinafter.

When performing the touch detection, the touch controller 16 transmits the scanning signals and the selection signals. The driving selector 15 receives the selection signals via the signal selection line 160. In response to the selection signals, the driving selector 15 selects one leading wire from the lead wires 150 connecting to a plurality of the electrodes 140 so as to electrically connect to the scanning signal line 161. In this way, the scanning signals transmitted from the touch controller 16 may be transmitted to the electrode 140 via the scanning signal line so as to scan the electrodes. The touch controller 16 further receives the electrode signals generated when the electrode has been scanned via the signal scanning line and the selected lead wires. The touch controller 16 transmits corresponding selections signals such that the driving selector 15 may select the lead wires 150 one by one. In this way, the electrodes 140 may receive the scanning signals transmitted from the touch controller 16 one by one so as to scan the electrodes and to feedback the corresponding electrode signals to the touch controller 16. The touch controller 16 determines the electrodes 140 for which the signals of the touching electrode have been changed in accordance with the received electrode signals so as to determine the coordinate of the touch points.

The electrode scanning method conducted by transmitting the scanning signals from the touch controller 16 to the electrodes 140 is self-capacitance scanning.

Figure 2:
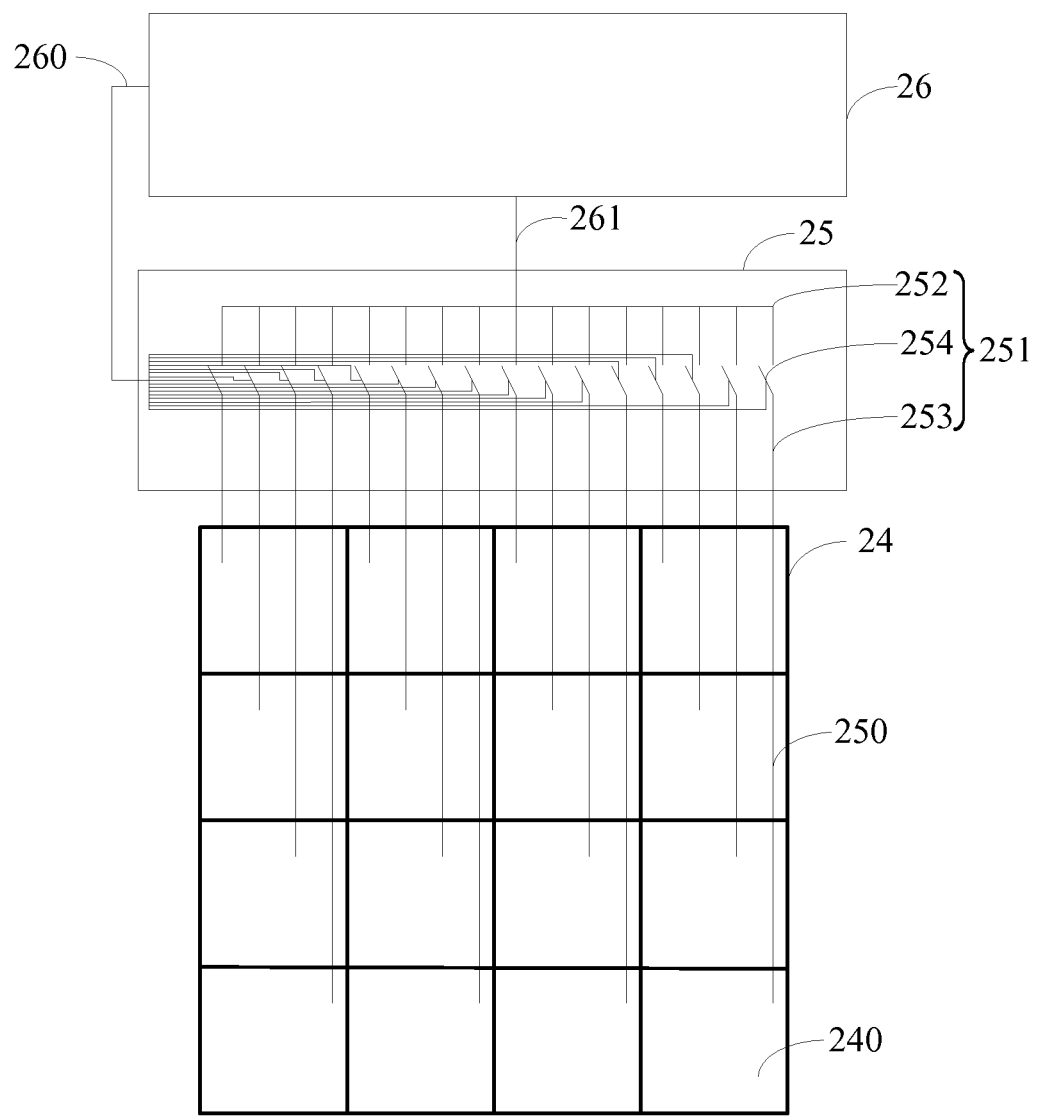
FIG. 2 is a schematic view of the embedded display panel with touch function in accordance with a second embodiment.

FIG. 2 is a schematic view of the embedded display panel with touch panel in accordance with a second embodiment.

The driving selector 25 includes a plurality of switching modules 251. Each of the switching modules 251 includes a first end 252, a second end 253, and a control end 254. The first ends 252 of each of the switching modules 251 are connected with each other, and are connected with the touch controller 26 via the scanning signal line 261. Each of the second ends 253 of the switching modules 251 connects with the electrode 240 via one lead wire 250. Each of the control ends 254 of the switching modules 251 connects with the touch controller 26 via the signal selection line 260.

In other embodiments, the display panel 10 includes a plurality of signal selection lines 260. Each of the signal selection lines 260 connects with the control ends 254 of a number of switching modules 251. The number of the switching modules 251 connecting with each of the signal selection line 260 may be the same or different. Specifically, a plurality of signal selection line 260 may be arranged. Each of the signal selection lines 260 connects to a number of electrodes 240 via the lead wires 250. The number of the electrodes 240 connecting with the signal selection line 260 may be the same or different. That is, the number of the electrodes 240 connecting with the signal selection line 260 may be planned and configured in accordance with real scenario. Similarly, the display panel 10 includes a plurality of scanning signal line 261. Each of the scanning signal lines 261 connects to the first end 252 of a number of switching modules 251. In one embodiment, a plurality of scanning signal line 261 may be arranged. The first ends 252 of the number of the scanning signal line 261 are connected with each and are connected with one scanning signal line 261. The number of the scanning signal line 261 for which the first ends 252 are connected with each other may be planned and arranged in accordance with real scenario. However, the number of the signal selection line 260 and the scanning signal line 261 has to be greatly less than the number of the lead wires 250 connecting with the electrode 240.

Figure 3:
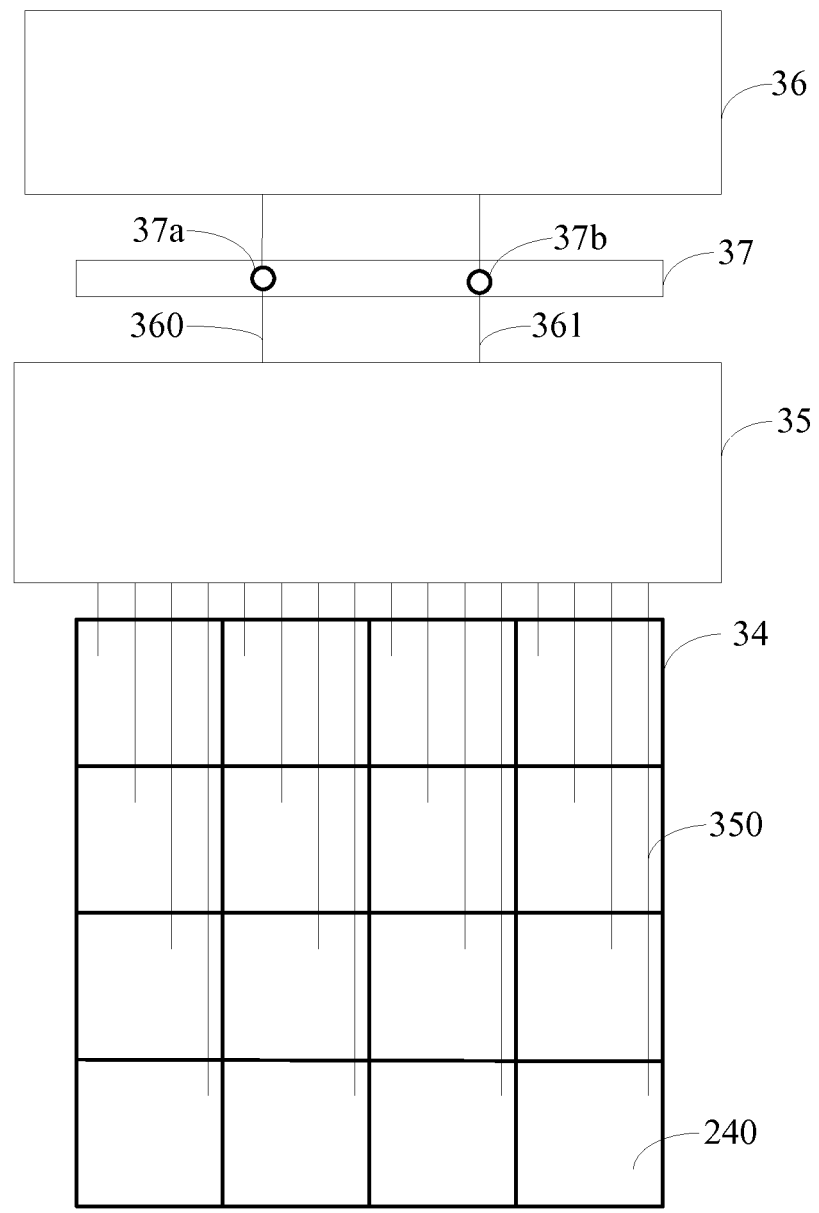
FIG. 3 is a schematic view of the embedded display panel with touch function in accordance with a third embodiment.

Other components in FIG. 2 may be also be referenced by corresponding descriptions for FIG. 1. FIG. 3 is a schematic view of the embedded display panel with touch panel in accordance with a third embodiment. The display panel 30 includes at least two pins 37a, 37b for binding the bonding package. The signal selection line 360 and the scanning signal line 361 connects to the corresponding pins 37a, 37b of the at least two bonding packages so as to connect the driving selector 35 and the touch controller 36. Specifically, the pins 37a, 37b of the at least two binding bonding package forms a bonding area 37. The bonding area 37 is arranged between the driving selector 35 and the touch controller 36. In the embodiment, the bonding area 37 is arranged within the area formed between the up substrate 31 and the down substrate 32, and the bonding area 37 has not been overlapped by other components within the area. The signal selection line 360 and the scanning signal line 361 are pulled out from the touch controller 36 and are connected with the pins 37a, 37b correspondingly. The signal selection line 360 and the scanning signal line 361 pulled from the pins 37a, 37b are connected with the driving selector 35. In this way, the driving selector 35 and the touch controller 36 are connected.

Further, a plurality of pins may be arranged within the bonding area 37, but the number of the pins is less than the number of the lead wires 340. The display panel 30 may be configured with a plurality of signal selection line 360 and scanning signal line 361 in accordance with the number of the pins so as to establish the connection between the driving selector 35 and the touch controller 36 as described above.

Other components in FIG. 3 may be also be referenced by corresponding descriptions for FIG. 1.

In another embodiment, other components in FIG. 3 may be also be referenced by corresponding descriptions for FIG. 2.

In addition, a terminal including the above-mentioned display panel is disclosed.

Figure 4:
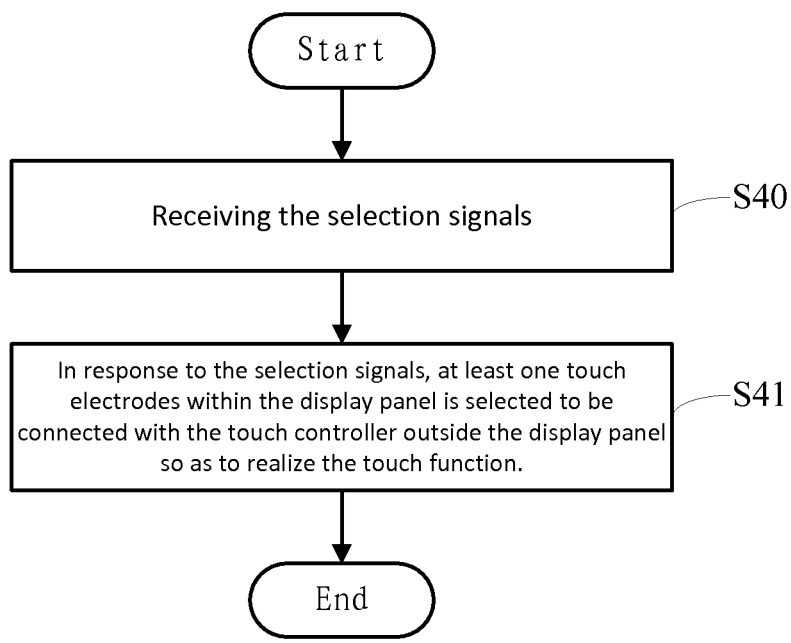
FIG. 4 is a flowchart illustrating a touch detection method in accordance with one embodiment.

FIG. 4 is a flowchart illustrating a touch detection method in accordance with one embodiment. The method includes the following steps.

In step S40, the selection signals are received.

In step S41, in response to the selection signals, at least one touch electrodes within the display panel is selected to be connected with the touch controller outside the display panel so as to realize the touch function.

Specifically, the scanning signals and the selections signals are generated upon touch detection. At least one lead wire is selected from a plurality of lead wires connecting to the electrodes according to the selection signals, and the selected lead wire is electrically connected with the touch controller outside the display panel. As such, the scanning signals transmitted from the touch controller may be transmitted to the electrode connected by the selected lead wire so as to scan the electrode.

The touch controller receives the electrode signals via the connection from the signal scanning line to the selected lead wire. The electrode signals are generated when the electrodes are scanned. The touch controller transmits corresponding selection signals to select the leading wires one by one such that the electrodes receive the scanning signals transmitted from the touch controller in turn so as to scan the electrodes and to feedback the corresponding electrode signals to the touch controller. The touch controller determines the electrodes for which the signals of the touching electrode have been changed in accordance with the received electrode signals so as to determine the coordinate of the touch points.

In the embodiment, the display panel may be self-capacitance touch panels. The scanning signals transmitted by the touch controller may be transmitted to the electrode connected by the selected lead wire so as to perform self-capacitance electrode scanning.

In view of the above, the touch electrode layer is arranged on the liquid crystal layer of the display panel. In addition, the driving selector is arranged within the display panel such that the leading wires are connected with the electrodes one by one. The touch controller outside the display panel is connected with the driving selector via the signal selection line and the scanning signal line. In addition, in response to the selection signals transmitted by the signal selection line, the driving selector is controlled to select at least one lead wire from a plurality of lead wires to be electrically connected with the scanning signals line. In addition, the number of the signal selection line and the scanning signal line is less than the number of the lead wires so as to greatly reduce the number of the leading wires needed to be connected to the touch controller.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. An embedded display panel with touch function, comprising:
   an up substrate, a down substrate, and a liquid crystal layer between the up substrate and the down substrate;

a touch electrode layer formed between the liquid crystal layer and the up substrate, and the touch electrode layer comprising a plurality of electrodes arranged in a matrix;

a driving selector being arranged between the up substrate and the down substrate, each of the electrodes being connected to the corresponding driving selector via lead wires; and a touch controller being arranged outside a space defined by the up substrate and the down substrate, the touch controller being connected to the driving selector via a signal selection line and a scanning signal line, and a number of the signal selection line and the scanning signal line is less than the number of the lead wires; and the touch controller is configured for transmitting selection signals to the driving selector via the signal selection line, and driving selector is configured for selecting at least one of the lead wires to be connected with the scanning signal line in response to the selection signals; and wherein the driving selector comprises a plurality of switching modules, each of the switching modules comprises a first end, a second end, and a control end, the first ends of each of the switching modules are connected with each other, and are connected with the touch controller via the scanning signal line;

each of the second ends of the switching modules connects with the electrode via one lead wire; and each of the control ends of the switching modules connects with the touch controller via the signal selection line.

2. The embedded display panel as claimed in claim 1, wherein the display panel comprises a plurality of signal selection lines, each of the signal selection lines connects with the control ends of a number of switching modules, and the number of the switching modules connecting with the signal selection line are the same or different.

3. The embedded display panel as claimed in claim 2, wherein the display panel comprises a plurality of scanning signals line, each of the scanning signals lines connects with the first end of a number of switching modules, and the number of the switching modules connecting with the signal selection line are the same or different.

4. The embedded display panel as claimed in claim 1, wherein the display panel further comprises at least two pins for binding bonding packages, and the signal selection line and the scanning signal line being connected to the corresponding pins of the at least two bonding packages so as to connect the driving selector and the touch controller.

5. The embedded display panel as claimed in claim 1, wherein the display panel is a self-capacitance touch panel.

6. A terminal, comprising:

an embedded display panel with touch function, the display panel comprises:

an up substrate, a down substrate, and a liquid crystal layer between the up substrate and the down substrate;

a touch electrode layer formed between the liquid crystal layer and the up substrate, and the touch electrode layer comprising a plurality of electrodes arranged in a matrix;

a driving selector being arranged between the up substrate and the down substrate, each of the electrodes being connected to the corresponding driving selector via lead wires; and a touch controller being arranged outside a space defined by the up substrate and the down substrate, the touch controller being connected to the driving selector via a signal selection line and a scanning signal line, and a number of the signal selection line and the scanning signal line is less than the number of the lead wires; and the touch controller is configured for transmitting selection signals to the driving selector via the signal selection line, and driving selector is configured for selecting at least one of the lead wires to be connected with the scanning signal line in response to the selection signals; and wherein the driving selector comprises a plurality of switching modules, each of the switching modules comprises a first end, a second end, and a control end, the first ends of each of the switching modules are connected with each other, and are connected with the touch controller via the scanning signal line;

each of the second ends of the switching modules connects with the electrode via one lead wire; and each of the control ends of the switching modules connects with the touch controller via the signal selection line.

7. The embedded display panel as claimed in claim 6, wherein the display panel comprises a plurality of signal selection lines, each of the signal selection lines connects with the control ends of a number of switching modules, and the number of the switching modules connecting with the signal selection line are the same or different.

8. The embedded display panel as claimed in claim 7, wherein the display panel comprises a plurality of scanning signals line, each of the scanning signals lines connects with the first end of a number of switching modules, and the number of the switching modules connecting with the signal selection line are the same or different.

9. The embedded display panel as claimed in claim 8, wherein the display panel further comprises at least two pins for binding bonding packages, and the signal selection line and the scanning signal line being connected to the corresponding pins of the at least two bonding packages so as to connect the driving selector and the touch controller.

10. The embedded display panel as claimed in claim 6, wherein the display panel is a self-capacitance touch panel.

* * * * *